United States Patent
Lee et al.

(10) Patent No.: US 8,377,583 B2
(45) Date of Patent: Feb. 19, 2013

(54) SEPARATOR FOR PROVIDING A UNITING FORCE TO ELECTRODE AND ELECTROCHEMICAL CELL CONTAINING THE SAME

(75) Inventors: Sang-Young Lee, Daejeon (KR); Seok-Koo Kim, Daejeon (KR); Jong-Hun Kim, Daejeon (KR); Jang-Hyuk Hong, Daejeon (KR)

(73) Assignee: LG Chem, Ltd. (KR)

( * ) Notice: Subject to any disclaimer, the term of this patent is extended or adjusted under 35 U.S.C. 154(b) by 251 days.

(21) Appl. No.: 12/864,734

(22) PCT Filed: Jan. 14, 2009

(86) PCT No.: PCT/KR2009/000186
§ 371 (c)(1),
(2), (4) Date: Jul. 27, 2010

(87) PCT Pub. No.: WO2009/096671
PCT Pub. Date: Aug. 6, 2009

(65) Prior Publication Data
US 2010/0323230 A1    Dec. 23, 2010

(30) Foreign Application Priority Data
Jan. 30, 2008    (KR) .................. 10-2008-0009723

(51) Int. Cl.
*H01M 2/16* (2006.01)
*H01M 2/18* (2006.01)
(52) U.S. Cl. .................. 429/143; 429/144; 429/145
(58) Field of Classification Search ............ 429/142–146
See application file for complete search history.

(56) References Cited

U.S. PATENT DOCUMENTS
4,973,532 A  * 11/1990 Taskier et al. ............... 429/62
7,662,517 B2    2/2010 Lee et al.

FOREIGN PATENT DOCUMENTS

| JP | 06-349681 A | 12/1994 |
|---|---|---|
| KR | 20030010406 A | 2/2003 |
| KR | 10-0758482 A | 6/2006 |
| KR | 20060072065 A | 6/2006 |
| KR | 20070000231 A | 1/2007 |
| WO | 03/012896 A1 | 2/2003 |
| WO | 2006/062349 A1 | 6/2006 |

OTHER PUBLICATIONS

International Search Report, PCT/KR2009/00186, dated Aug. 24, 2009.

* cited by examiner

*Primary Examiner* — Tracy Dove
(74) *Attorney, Agent, or Firm* — Lerner, David, Littenberg, Krumholz & Mentlik, LLP

(57) ABSTRACT

A separator includes a porous substrate having a plurality of pores; a porous coating layer formed on at least one surface of the porous substrate and made of a mixture of a plurality of inorganic particles and a binder polymer; and a dot pattern layer formed on a surface of the porous coating layer and having a plurality of dots made of polymer and arranged at predetermined intervals. The separator may control short-circuit between positive and negative electrodes though an electrochemical device is overheated. Also, a united force to an electrode is enhanced due to the polymer dot pattern layer, thereby preventing the electrode and the separator from being separated. Accordingly, inorganic particles of the porous coating layer formed on the porous substrate are not separated, thereby improving stability of an electrochemical device.

17 Claims, 2 Drawing Sheets

SEPARATOR FOR PROVIDING A UNITING FORCE TO ELECTRODE AND ELECTROCHEMICAL CELL CONTAINING THE SAME

CROSS REFERENCE TO RELATED APPLICATIONS

The present application is a national phase entry under 35 U.S.C. §371 of International Application No. PCT/KR2009/000186, filed Jan. 14, 2009, published in English, which claims priority from Korean Patent Application No. 10-2008-0009723, filed Jan. 30, 2008. The disclosures of said applications are incorporated by reference herein.

TECHNICAL FIELD

The present invention relates to a separator of an electrochemical device such as a lithium secondary battery and an electrochemical device having the same. More particularly, the present invention relates to a separator in which a porous coating layer made of a mixture of a binder polymer and inorganic particles is formed on the surface of a porous substrate, and an electrochemical containing the same.

BACKGROUND ART

Recently, there has been an increasing interest in energy storage technology. Batteries have been widely used as energy sources in the fields of cellular phones, camcorders, notebook computers, PCs and electric cars, resulting in intensive research and development into them. In this regard, electrochemical devices are one of the subjects of great interest. Particularly, development of rechargeable secondary batteries has been the focus of attention.

Among currently used secondary batteries, lithium secondary batteries developed in early 1990's have a higher drive voltage and a much higher energy density than those of conventional batteries using a liquid electrolyte solution such as Ni-MH batteries, Ni—Cd batteries, and sulphuric acid-lead batteries. For these reasons, the lithium secondary batteries are greatly spotlighted. Such a lithium secondary battery is assembled while interposing a separator between positive and negative electrodes. The separator is an important component that plays a role of ion passage in the battery and prevents the positive and negative electrodes from being directly contacted and thus short-circuiting the battery.

In the safety characteristics of the electrochemical device, overheating of the electrochemical device may cause thermal runaway, and explosion may occur when a separator is pierced. In particular, a polyolefin porous substrate commonly used as a separator of an electrochemical device shows extreme thermal shrinking behavior at a temperature of 100° C. or above due to the features of its material and its manufacturing process such as elongation, so there may occur an electric short circuit between positive and negative electrodes.

In order to solve the above safety-related problems of the electrochemical device, Korean Laid-open Patent Publication No. 10-2006-72065 and No. 10-2007-231 disclose a separator 10 having a porous coating layer formed by coating at least one surface of a porous substrate 1 having many pores with a mixture of inorganic particles 3 and a binder polymer 5 (see FIG. 1). In the separator 10, the inorganic particles 3 in the porous coating layer formed on the porous substrate 1 act as a kind of spacer that may keep a physical shape of the porous coating layer, so the inorganic particles 3 restrain thermal shrinkage of the porous substrate when the electrochemical device is overheated. In addition, interstitial volumes exist among the inorganic particles, thereby forming fine pores.

As mentioned above, the porous coating layer formed on the porous substrate contributes to the improvement of safety of the separator. However, the porous coating layer containing inorganic particles may deteriorate a united force between the electrode and the separator. Thus, during an assembling process of an electrochemical device such as a taking-up and assembling process of an electrode and a separator, the electrode and the separator may be more likely not closely adhered to each other but separated from each other, so lithium ions may be not effectively transferred, which may deteriorate the performance of a battery. In addition, the inorganic particles of the porous coating layer may be separated while the electrode and the separator are separated, and the separated inorganic particles may act as a local defect of the electrochemical device, thereby giving a bad influence on the safety of the electrochemical device.

DISCLOSURE OF INVENTION

Technical Problem

The present invention is designed to solve the problems of the prior art, and therefore an object of the invention is to provide a separator capable of preventing separation of an electrode and a separator having a porous coating layer and also preventing separation of inorganic particles in the porous coating layer, and an electrochemical device containing such a separator.

Technical Solution

In order to accomplish the first object, the present invention provides a separator, which includes a porous substrate having a plurality of pores; a porous coating layer formed on at least one surface of the porous substrate and made of a mixture of a plurality of inorganic particles and a binder polymer; and a dot pattern layer formed on a surface of the porous coating layer and having a plurality of dots made of polymer and arranged at predetermined intervals.

In the separator according to the present invention, the dots are preferably made of rubber, and the dots may be formed using natural rubbers, synthetic resins, or their mixtures. In particular, the rubber dots are preferably formed with a copolymer including a styrene unit and a butadiene unit. Such a copolymer preferably further includes a hydrophilic functional group-containing unit such as maleic acid, acrylic acid, acrylate, carboxylic acid, nitrile group, hydroxyl group, mercapto group, ether group, ester group, amide group, amine group, acetate group and halogen group.

In the separator according to the present invention, the dots preferably have an average diameter of 0.1 to 10 mm, the intervals of the dots are preferably 0.1 to 100 mm, and the dots preferably have an average thickness of 0.001 to 10 μm.

The separator of the present invention disclosed above may be used for electrochemical devices such as a lithium secondary battery an a super capacity device as being interposed between positive and negative electrodes.

ADVANTAGEOUS EFFECTS

The separator according to the present invention gives the following effects.

First, even when an electrochemical device is overheated, it is possible to restrain electric short-circuit between positive and negative electrodes since a porous coating layer is provided on a surface of a porous substrate.

Second, a united force to an electrode is enhanced due to a polymer dot pattern layer formed on the surface of the porous coating layer, so the electrode and the separator are not separated from each other during an assembling process of an electrochemical device.

Third, since the separation between the electrode and the separator is controlled, inorganic particles of the porous coating layer formed on the porous substrate are not separated.

BEST MODE FOR CARRYING OUT THE INVENTION

Figure 1:
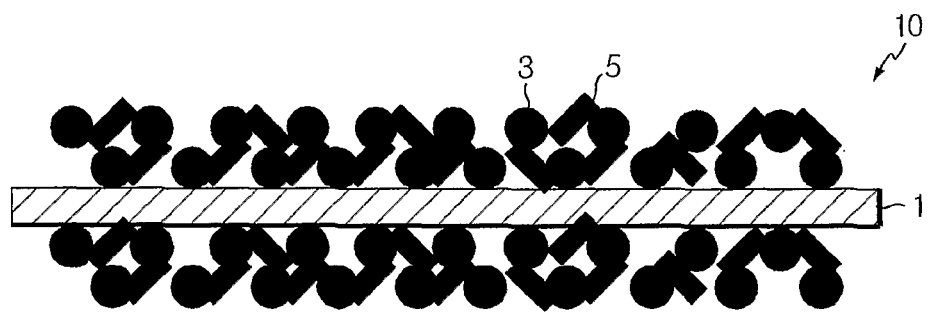
FIG. 1 is a schematic sectional view showing a separator having a porous coating layer.

Hereinafter, preferred embodiments of the present invention will be described in detail referring to the accompanying drawings. Prior to the description, it should be understood that the terms used in the specification and appended claims should not be construed as limited to general and dictionary meanings, but interpreted based on the meanings and concepts corresponding to technical aspects of the present invention on the basis of the principle that the inventor is allowed to define terms appropriately for the best explanation.

A separator according to the present invention includes a porous substrate having a plurality of pores; and a porous coating layer formed on at least one surface of the porous substrate and made of a mixture of a plurality of inorganic particles and a binder polymer. The separator also includes a dot pattern layer formed on a surface of the porous coating layer and having a plurality of dots made of polymer and arranged at predetermined intervals.

As mentioned above, the porous coating layer is formed with a mixture of inorganic particles and a binder polymer, so a united force of the separator to the electrode is not great. Thus, during an assembling process of an electrochemical device, the electrode and the separator may be separated from each other. However, if the dot pattern layer made of polymer is formed on the porous coating layer according to the present invention, a united force between the electrode and the separator may be enhanced. In particular, if the dots are made of rubber exhibiting rubber elasticity at a normal temperature, the united force between the electrode and the separator is further enhanced. In addition, since a plurality of dots are formed at predetermined intervals in the dot pattern layer, the dot pattern layer does not disturb lithium ion transferring ability of the porous coating layer.

In the separator of the present invention, the dots may use any polymer capable of accomplishing the object of the present invention, directed to enhancing a united force between an electrode and a separator. Preferably, the dots use natural rubbers or synthetic rubbers, in single or in combination, in aspect of the enhancement of a united force. The rubber polymer for the dots is more preferably a copolymer including a styrene unit and a butadiene unit. Such a styrene-butadiene copolymer exhibits a low impregnation rate to electrolyte, so it has low possibility of dissolution or deformation in a battery. In addition, the styrene-butadiene copolymer allows to easily control physical features such as a glassy state and a rubbery state by adjusting a ratio of styrene-containing monomer and butadiene-containing monomer. For example, the styrene-butadiene copolymer may be controlled to have a glass transition temperature Tg of 40° C. or less, or greatly less than 40° C.

In addition, the copolymer including a styrene unit and a butadiene unit, namely the styrene-butadiene copolymer, may be further copolymerized with a hydrophilic functional group-containing monomer so as to double the united force effect by forming a hydrogen bond with an electrode. The hydrophilic functional group may be maleic acid, acrylic acid, acrylate, carboxylic acid, nitrile group, hydroxyl group, mercapto group, ether group, ester group, amide group, amine group, acetate group and halogen group. These functional groups may be contained in single or in mixture.

In one embodiment of the present invention, the styrene-butadiene copolymer used for forming dots may be controlled such that the contents of styrene unit and butadiene unit are respectively 1 to 99%, but the content of styrene unit is suitably controlled not to exceed 50 weight %. Also, it is also possible to further copolymerize other monomers without deteriorating the effect of the present invention or further add other additives such as thickeners like a silane coupling agent. Also, the styrene-butadiene copolymer preferably has a mean molecular weight of 10,000 to 1,000,000, though not limited specially.

In the present invention, the dot pattern layer may have various dot shapes, dot sizes and pattern arrangements if it may improve the united force without deteriorating the lithium ion transferring ability of the porous coating layer. Namely, the dots may be controlled to shapes such as circle, triangle, rectangle or oval, and several dots may be connected at their borders to form one big dot. Also, dots may be arranged in a regular pattern, or dots may be arranged more densely in a peripheral region of the separator rather than in an inner area of the separator.

Considering the improvement of united force of the pattern layer to an electrode and the possibility of performance deterioration of an electrochemical device caused by the pattern layer, the dots preferably have an average diameter of 0.1 to 10 mm, intervals of 0.1 to 100 mm, and an average thickness of 0.001 to 10 μm. If the size and interval of dots are made as smallest as possible while ensuring sufficient improvement of the united force to an electrode, the separation of inorganic particles may be solved since the dots also improve united force among inorganic particles of the porous coating layer.

In the present invention, the binder polymer of the porous coating layer formed on the surface of the porous substrate may use any polymer useable in forming a porous coating layer together with inorganic particles, preferably polymers with a solubility parameter of 15 to 45 Mpa$^{1/2}$. The binder polymer plays a role of connecting inorganic particles and thus stably fixing them. The binder polymer may be polyvinylidene fluoride-co-hexafluoropropylene, polyvinylidene fluoride-co-trichloroethylene, polymethylmethacrylate, polyacrylonitrile, polyvinylpyrrolidone, polyvinylacetate, polyethylene-co-vinyl acetate, polyethylene oxide, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxyl methyl cellulose, acrylonitrile-styrene-butadiene copolymer and polyimide, without any special limitation. These binder polymers may be used in single or in mixture.

In the separator of the present invention, the inorganic particles used in forming the porous coating layer is not specially limited it they are electrochemically stable. Namely, inorganic particles available in the present invention are not specially limited if they do not cause oxidation or reduction reaction in an operating voltage range (for example, 0 to 5V based on $Li/Li^+$) of an electrochemical device to which the inorganic particles are applied. In particular, in case an inorganic particle with ion transferring capability is used, it is possible to enhance the performance of the electrochemical device by increasing ion conductivity. In addition, in case an inorganic particle with a high dielectric constant is used, it contributes to the increase of dissociation of electrolyte salt, for example lithium salt, in the liquid electrolyte, thereby improving ion conductivity of the electrolyte.

Due to the above reasons, it is preferred that the inorganic particles may include inorganic particles having a dielectric constant of 5 or above, preferably 10 or above, inorganic particles having lithium-ion transferring capability, or their mixtures. The inorganic particle having a dielectric constant of 5 or above may be for example $BaTiO_3$, $Pb(Zr,Ti)O_3$ (PZT), $Pb_{1-x}La_xZr_{1-y}Ti_yO_3$ (PLZT), $PB(Mg_{2/3}Nb_{2/3})O_3$—$PbTiO_3$ (PMN-PT), hafnia ($HfO_2$), $SrTiO_3$, $SnO_2$, $CeO_2$, MgO, NiO, CaO, ZnO, $ZrO_2$, $Y_2O_3$, $Al_2O_3$, $TiO_2$, SiC, or their mixtures, but not limitedly.

In particular, the inorganic particles such as of $BaTiO_3$, $Pb(Zr,Ti)O_3$ (PZT), $Pb_{1-x}La_xZr_{1-y}Ti_yO_3$ (PLZT), $PB(Mg_{2/3}Nb_{2/3})O_3$—$PbTiO_3$ (PMN-PT) and hafnia ($HfO_2$) show a high dielectric constant of 100 or above and have piezoelectricity since charges are generated to make a potential difference between both surfaces when a certain pressure is applied thereto to extend or shrink them, so the above inorganic particles may prevent generation of an internal short circuit of both electrodes caused by an external impact and thus further improve the safety of the electrochemical device. In addition, in case the inorganic particles having a high dielectric constant are mixed with the inorganic particles having lithium ion transferring capability, their synergistic effect may be doubled.

In the present invention, the inorganic particle having lithium ion transferring capability means an inorganic particle containing lithium atom and having a function of moving a lithium ion without storing the lithium. The inorganic particle having lithium ion transferring capability may transfer and move lithium ions due to a kind of defect existing in the particle structure, so it is possible to improve lithium ion conductivity in a battery and also improve the performance of the battery. The inorganic particle having lithium ion transferring capability may be lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), $(LiAlTiP)_xO_y$, type glass ($0<x<4$, $0<y<13$) such as $14Li_2O-9Al_2O_3-38TiO_2-39P_2O_5$, lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$) such as $Li_{3.25}Ge_{0.25}P_{0.75}S_4$, lithium nitrides ($Li_xN_y$, $0<x<4$, $0<y<2$) such as $Li_3N$, $SiS_2$ type glass ($Li_xSi_yS_z$, $0<x<3$, $0<y<2$, $0<z<4$) such as $Li_3PO_4$—$Li_2S$—$SiS_2$, $P_2S_5$ type glass ($Li_xP_yS_z$, $0<x<3$, $0<y<3$, $0<z<7$) such as LiI—$Li_2S$—$P_2S_5$, or their mixtures, but not limitedly.

In the separator according to the present invention, the size of inorganic particles in the porous coating layer is not specially limited, but the particle size is preferably 0.001 to 10 μm in order to form a coating layer with a uniform thickness and ensure suitable porosity.

A ratio of the inorganic particles to the binder polymer in the porous coating layer provided to the separator of the present invention is preferably 50:50 to 99:1, more preferably from 70:30 to 95:5. If the ratio of the inorganic particles to the binder polymer is less than 50:50, the content of polymer is so great that the thermal stability of the separator may be not much improved. In addition, pore size and porosity may be decreased due to the decrease of interstitial volume formed among the inorganic particles, thereby causing deterioration of the performance of a final battery. If the content of inorganic particles exceeds 99 parts by weight, the peeling resistance of the porous coating layer may be weakened since the content of binder polymer is so small. The thickness of the porous coating layer composed of the inorganic particles and the binder polymer is not specially limited but is preferably 0.01 to 20 μm. Also, pore size and porosity are not specially limited, but the pore size is preferably 0.001 to 10 μm and the porosity is preferably 10 to 99%. The pore size and porosity are mainly dependent on the size of inorganic particles. For example, in case inorganic particles have a diameter of 1 μm or less, the formed pore is also approximately 1 μm or less. The pores as mentioned above are filled with electrolyte injected later, and the filled electrolyte plays a role of transferring ions.

In addition, in the separator of the present invention, the porous substrate having a plurality of pores may adopt any porous substrate commonly used for a separator of an electrochemical device. For example, the porous substrate may be a membrane or a fabric substrate formed using any one polymer such as polyethyleneterephthalate, polybutyleneterephthalate, polyester, polyacetal, polyamide, polycarbonate, polyimide, polyetheretherketone, polyethersulfone, polyphenyleneoxide, polyphenylenesulfidro, polyethylenenaphthalene, polyvinylidene fluoride, polyethyleneoxide, polyacrylonitrile, hexafluoropropylene copolymer, polyethylene and polypropylene, or their mixtures.

Thickness of the porous substrate is not specially limited, but preferably 5 to 50 μm. Pore size and porosity in the porous substrate are also not specially limited, but preferably 0.001 to 50 μm and 10 to 99%, respectively.

Hereinafter, a preferred preparation method of the separator according to the present invention is exemplarily explained, but the present invention is not limited thereto.

First, a binder polymer is dissolved in a solvent to make a binder polymer solution. Subsequently, inorganic particles are added to the binder polymer solution and dispersed therein. The solvent preferably has a solubility parameter similar to that of the used binder polymer and a low boiling point. It will help uniform mixture and easy removal of the solvent afterward. Non-limiting examples of usable solvents include acetone, tetrahydrofuran, methylene chloride, chloroform, dimethylformamide, N-methyl-2-pyrrolidone (NMP), cyclohexane, and water, or their mixtures. It is preferred that the inorganic particles are pulverized after being added to the binder polymer solution. At this time, the time required for pulverization is suitably 1 to 20 hours, and the particle size of the pulverized particles is preferably 0.001 and 10 μm, as mentioned above. Conventional pulverization methods may be used, and ball milling is particularly preferred.

After that, a porous substrate is coated with the binder polymer solution in which the inorganic particles are dispersed, and then dried. In order to coat the porous substrate with the binder polymer solution in which the inorganic particles are dispersed, common coating methods well known in the art may be used. For example, various methods such as dip coating, die coating, roll coating, comma coating or their combinations may be used. Also, the porous coating layer may be formed on both surfaces of the porous substrate or selectively on any one surface of the porous substrate.

Subsequently, a solution obtained by dissolving or dispersing a polymer component such as rubber in a solvent is dot-injected onto the porous coating layer and then dried to form a dot pattern layer. The process speed may be further improved if an organic solvent with good drying property is used as the solvent for forming the dot pattern layer. The dot-injecting method may adopt ink-jet injection or spraying, among which the ink-jet injection allowing very precise control of injection location is preferred.

The separator prepared as mentioned above according to the present invention may be used as a separator of an electrochemical device, which is interposed between positive and negative electrodes. The electrochemical device may be any device in which electrochemical reactions may occur, and specific examples of the electrochemical devices include all kinds of primary batteries, secondary batteries, fuel cells, solar cells or capacitors such as a super capacitor. In particular, among the secondary batteries, lithium secondary batteries such as a lithium metal secondary battery, a lithium ion secondary battery, a lithium polymer secondary battery or a lithium ion polymer secondary battery are preferred.

The electrochemical device may be made according to common methods well known in the art. For example, the electrochemical device may be made by interposing the above separator between positive and negative electrodes, and then injecting an electrolyte therein.

There is no special limitation in electrodes that may be used together with the separator of the present invention, and the electrode may be manufactured in a form that electrode active materials are united to electrode current collectors according to one of common methods well known in the art. Among the electrode active materials, positive electrode active material may adopt common positive electrode active material available for a positive electrode of conventional electrochemical devices. Particularly, the positive electrode active material preferably uses lithium manganese oxides, lithium cobalt oxides, lithium nickel oxides, lithium iron oxides or lithium composite oxides thereof, not limitedly. Also, non-limiting examples of negative electrode active materials are lithium intercalation materials such as lithium metal, lithium alloy, carbon, petroleum coke, activated carbon, graphite or other carbonaceous materials. Non-limiting examples of the positive electrode current collector include a foil made of aluminum, nickel or combinations thereof, and non-limiting examples of the negative electrode current collector include a foil made of copper, gold, nickel, copper alloys or combinations thereof.

The electrolyte solution useable in the present invention includes a salt represented by the formula of $A^+B^-$, wherein $A^+$ represents an alkali metal cation such as $Li^+$, $Na^+$, $K^+$ or their combinations, and $B^-$ represents an salt containing an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$ or their combinations. The salt may be dissolved or dissociated in an organic solvent composed of propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethylmethyl carbonate (EMC), gamma-butyrolactone (γ-butyrolactone), or their mixtures. However, the electrolyte solution useable in the present invention is not limited to the above examples.

The electrolyte solution may be injected in a suitable step during the manufacturing process of a battery, according to the manufacturing process and desired properties of a final product. In other words, the electrolyte solution may be injected before a battery is assembled or during a final step of the assembly process of a battery.

To apply the separator of the present invention to a battery, a folding process and a lamination or stack process for the separator and the electrode may be used in addition to a general winding process.

MODE FOR THE INVENTION

Hereinafter, various preferred examples of the present invention will be described in detail for better understandings. However, the examples of the present invention may be modified in various ways, and they should not be interpreted as limiting the scope of the invention. The examples of the present invention are just for better understandings of the invention to persons having ordinary skill in the art.

Embodiment 1

Manufacture of Separator 5 weight % of polyvinylidenefluoride-hexafluoropropylene copolymer (PVdF-HFP) was added to acetone and dissolved over at 50° C. for 12 hours or more to make a binder polymer solution. $Al_2O_3$ powder was added to the prepared binder solution such that a weight ratio of binder polymer/$Al_2O_3$ is 10/90, and then $Al_2O_3$ powder was pulverized and dispersed for 12 hours or more by ball milling to make a slurry. The diameter of $Al_2O_3$ powder in the prepared slurry was about 400 nm. The prepared slurry was used for coating a polyethylene porous film (with a porosity of 45%) having a thickness of 18 μm by means of dip coating, and a coating thickness was controlled to be about 3 μm.

As a result of measurement using a porosimeter, a pore size in the porous coating layer formed on the polyethylene porous film was 0.4 μm, and a porosity was 55%. A solution having styrene-butadiene rubber (produced by LG CHEM Ltd., with a mean molecular weight of about 100,000) dissolved therein was dot-injected to a surface of the prepared separator in an ink-jet manner and then dried to form a dot pattern layer. The used styrene-butadiene rubber was composed of styrene (23%), butadiene (67%), nitrile group (5%) and carboxyl group (5%).

In the formed dot pattern layer, dots had an average diameter of 1 mm, intervals among the dots were 5 mm, and an average thickness of the dots was 0.5 μm.

Preparation of Negative Electrode 96 weight % of carbon powder as a negative electrode active material, 3 weight % of polyvinylidene fluoride (PVdF) as a coupling agent and 1 weight % of carbon black as a conductive material were added to N-methyl-2 pyrrolidone (NMP) as a solvent to make a negative electrode mixture slurry. The negative electrode mixture slurry was applied to a copper (Cu) film that is a negative electrode current collector with a thickness of 10 μm, and then dried to make a negative electrode, and then roll pressing was conducted thereto.

Preparation of Positive Electrode 94 weight % of lithium cobalt composite oxide as a positive electrode active material, 3 weight % of carbon black as a conductive material and 3 weight % of PVdF as a coupling agent were added to N-methyl-2 pyrrolidone (NMP) as a solvent to make a positive electrode mixture slurry. The positive electrode mixture slurry was applied to an aluminum (Al) film that is a positive electrode current collector with a thickness of 20 μm, and then dried to make a positive electrode, and then roll pressing was conducted thereto.

Manufacture of Battery

The electrodes and the separator prepared above were assembled in a stack & folding method to make a battery.

Embodiment 2

A lithium secondary battery was prepared in the same way as the embodiment 1, except that an acetone solution in which 5 weight % of polyvinylidenefluoride-hexafluoropropylene copolymer (PVdF-HFP) was dissolved as a solution for forming the dot pattern layer instead of a solution in which styrene-butadiene rubber is dispersed.

COMPARATIVE EXAMPLE 1

A lithium secondary battery was prepared in the same way as the embodiment 1, except that a dot pattern layer is not formed on the porous coating layer.

Interface Peeling Test between Electrode and Separator

The following experiment was conducted to the separators prepared according to the above embodiments and comparative example.

The separators of the embodiments 1 and 2 and the comparative example 1 were respectively laminated on electrodes, and then each separator was separated from the electrode to evaluate an interface peeling test.

Figure 2:
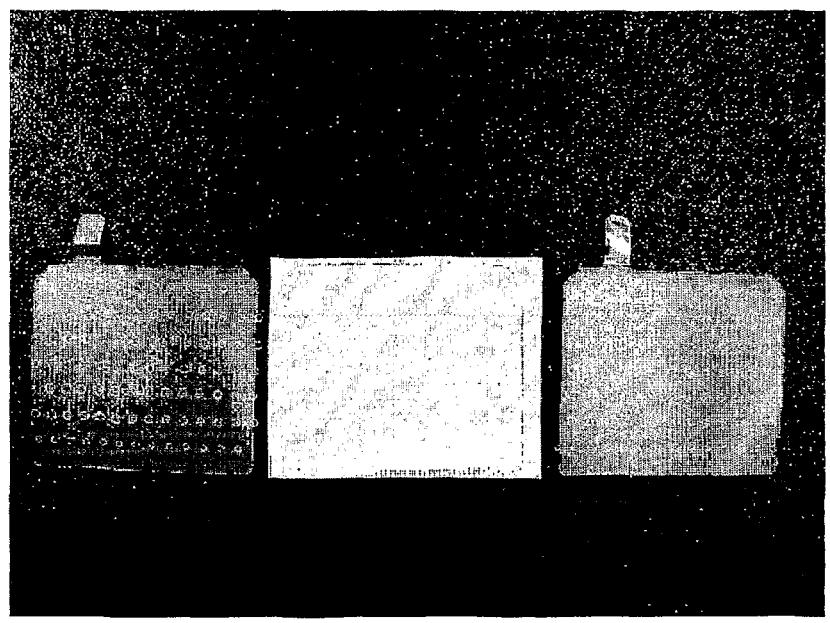
FIG. 2 is a photograph showing a separator of an embodiment 1, which is separated from an electrode.
Figure 3:
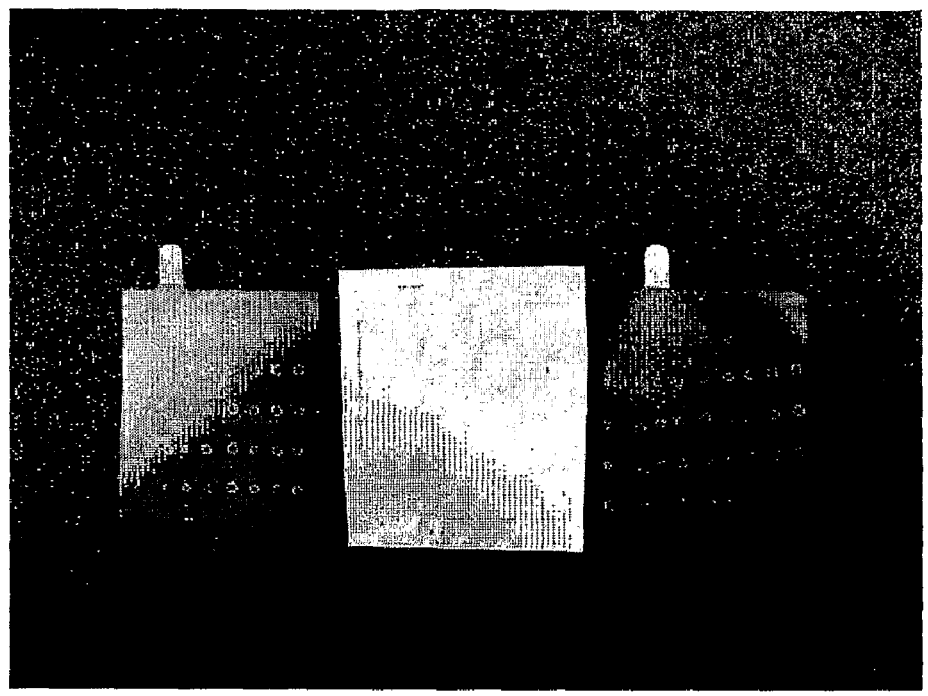
FIG. 3 is a photograph showing a separator of an embodiment 2, which is separated from an electrode.
Figure 4:
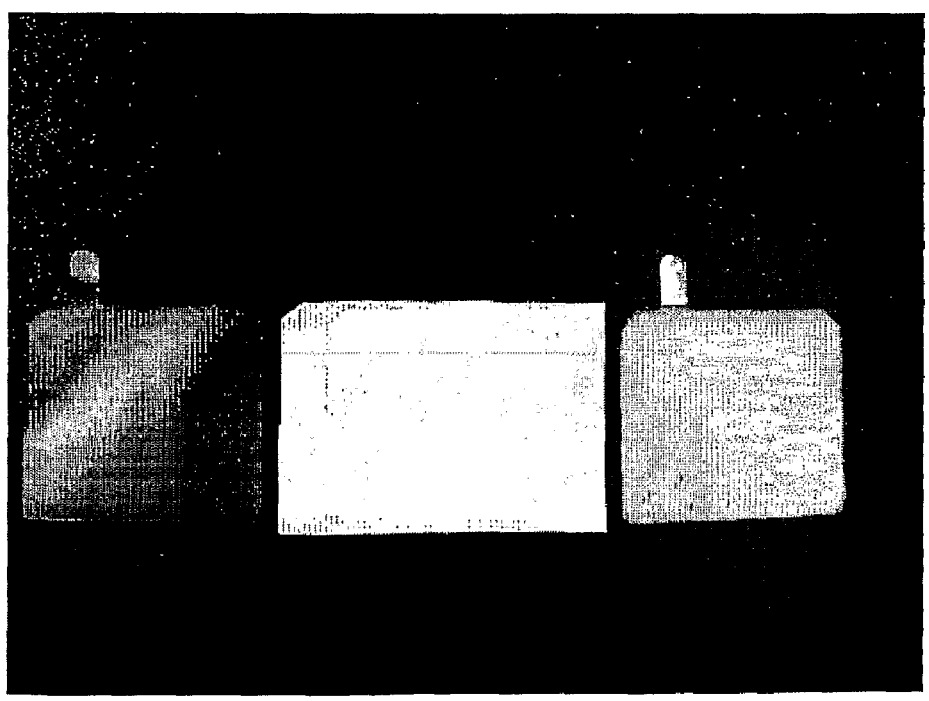
FIG. 4 is a photograph showing a separator of a comparative example 1, which is separated from an electrode.

As shown in FIG. 2, in the separator of the embodiment 1, it would be understood that some dots remained on the electrode surface, so the adhesion of the separator of the embodiment 1 to the electrode is reinforced. Also, referring to FIG. 3, in the separator of the embodiment 2, some dots also remained on the electrode surface, so it would be understood that the adhesion of the separator of the embodiment 2 to the electrode is reinforced, but not greater than the case of the embodiment 1. Meanwhile, in the separator of the comparative example 1, the surfaces of the separator and the electrode are all clean, so they were easily separated.

The invention claimed is:

1. A separator for an electrochemical device, comprising:
   a porous substrate having a plurality of pores;
   a porous coating layer formed on at least one surface of the porous substrate and made of a mixture of a plurality of inorganic particles and a binder polymer; and
   a dot pattern layer formed on a surface of the porous coating layer to provide a uniting force between the separator and an electrode of the electrochemical device, the dot pattern having a plurality of dots made of polymer and arranged at predetermined intervals, wherein the dots have an average diameter of about 1 mm to 10 mm.

2. The separator according to claim 1, wherein the dots are made of rubber.

3. The separator according to claim 2, wherein the rubber is any one selected from the group consisting of natural rubbers, synthetic rubbers and their mixtures.

4. The separator according to claim 2, wherein the rubber is a copolymer comprising a styrene unit and a butadiene unit.

5. The separator according to claim 4, wherein the copolymer further comprises a hydrophilic functional group-containing unit.

6. The separator according to claim 5, wherein the hydrophilic functional group is any one selected from the group consisting of maleic acid, acrylic acid, acrylate, carboxylic acid, nitrile group, hydroxyl group, mercapto group, ether group, ester group, amide group, amine group, acetate group and halogen group.

7. The separator according to claim 1, wherein the intervals of the dots are 0.1 to 100 mm.

8. The separator according to claim 1, wherein the dots have an average thickness of 0.001 to 10 μm.

9. The separator according to claim 1, wherein the binder polymer has a solubility parameter of 15 to 45 $Mpa^{1/2}$.

10. The separator according to claim 1, wherein the binder polymer is any one selected from the group consisting of polyvinylidene fluoride-co-hexafluoropropylene, polyvinylidene fluoride-co-trichloroethylene, polymethylmethacrylate, polyacrylonitrile, polyvinylpyrrolidone, polyvinylacetate, polyethylene-co-vinyl acetate, polyethylene oxide, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxyl methyl cellulose, acrylonitrile-styrene-butadiene copolymer, polyimide, and their mixtures.

11. The separator according to claim 1, wherein inorganic particles have a size of 0.001 to 10 μm.

12. The separator according to claim 1, wherein a weight ratio of the inorganic particles and the binder polymer is 50:50 to 99:1.

13. The separator according to claim 1, wherein the porous coating layer has a thickness of 0.01 to 20 μm, a pore size of 0.001 to 10 μm, and porosity of 10 to 99%.

14. The separator according to claim 1, wherein the porous substrate is formed with any one selected from the group consisting of polyethyleneterephthalate, polybutyleneterephthalate, polyester, polyacetal, polyamide, polycarbonate, polyimide, polyetheretherketone, polyethersulfone, polyphenyleneoxide, polyphenylenesulfidro, polyethylenenaphthalene, polyvinylidene fluoride, polyethyleneoxide, polyacrylonitrile, hexafluoropropylene copolymer, polyethylene, polypropylene, and their mixtures.

15. The separator according to claim 1, wherein the porous substrate has a thickness of 5 to 50 μm, a pore size of 0.001 to 50 μm, and porosity of 10 to 99%.

16. An electrochemical device, comprising a positive electrode, a negative electrode, and a separator interposed between the positive electrode and the negative electrode, wherein the separator comprises:
   a porous substrate having a plurality of pores;
   a porous coating layer formed on at least one surface of the porous substrate and made of a mixture of a plurality of inorganic particles and a binder polymer; and
   a dot pattern layer formed on a surface of the porous coating layer to provide a uniting force between the separator and the positive and negative electrodes of the electrochemical device, the dot pattern having a plurality of dots made of polymer and arranged at predetermined intervals, wherein the dots have an average diameter of about 1 mm to 10 mm.

17. The electrochemical device according to claim 16, wherein the electrochemical device is a lithium secondary battery.

* * * * *